(12) United States Patent
Loftus et al.

(10) Patent No.: US 12,305,753 B2
(45) Date of Patent: May 20, 2025

(54) VEHICLE DRIVETRAIN MODES

(71) Applicant: JAGUAR LAND ROVER LIMITED, Coventry (GB)

(72) Inventors: Daniel Loftus, Kineton (GB); Giuseppe Favorito, Coventry (GB); Jonathan Green, Coventry (GB)

(73) Assignee: JAGUAR LAND ROVER LIMITED, Warwickshire (GB)

( * ) Notice: Subject to any disclaimer, the term of this patent is extended or adjusted under 35 U.S.C. 154(b) by 0 days.

(21) Appl. No.: 18/700,697

(22) PCT Filed: Oct. 12, 2022

(86) PCT No.: PCT/EP2022/078436
§ 371 (c)(1),
(2) Date: Apr. 11, 2024

(87) PCT Pub. No.: WO2023/066764
PCT Pub. Date: Apr. 27, 2023

(65) Prior Publication Data
US 2024/0401696 A1  Dec. 5, 2024

(30) Foreign Application Priority Data
Oct. 22, 2021 (GB) .................................... 2115246

(51) Int. Cl.
*F16H 63/50* (2006.01)
*F16H 59/52* (2006.01)
(Continued)

(52) U.S. Cl.
CPC ............ *F16H 63/50* (2013.01); *F16H 59/52* (2013.01); *F16H 59/58* (2013.01); *F16H 59/64* (2013.01);
(Continued)

(58) Field of Classification Search
CPC .......... F16H 59/52; F16H 59/58; F16H 59/64; F16H 59/66; F16H 59/72;
(Continued)

(56) References Cited

U.S. PATENT DOCUMENTS 9,988,038 B2   6/2018   Zhang et al.
2007/0271026 A1   11/2007   Hijikata
(Continued)

FOREIGN PATENT DOCUMENTS

| KR | 20220006668 A | 1/2022 |
|---|---|---|
| WO | 2014037542 A1 | 3/2014 |
| WO | 2014048947 A1 | 4/2014 |

OTHER PUBLICATIONS

Combined Search and Examination Report corresponding to application GB2115246.7, dated Mar. 24, 2022, 4 pages.
(Continued)

*Primary Examiner* — Edwin A Young
(74) *Attorney, Agent, or Firm* — TROUTMAN PEPPER LOCKE LLP; Dustin B. Weeks; Nicholas Doss

(57) ABSTRACT

Embodiments of the present invention provide a vehicle drivetrain assembly operable in a first mode and a second mode. The vehicle drivetrain assembly comprises: a drive unit arranged to generate power to drive a vehicle (1); an automatic transmission comprising a torque converter and operatively coupled to the drive unit to receive the power; and a control system comprising one or more controllers (11), the control system being arranged to adjustably limit the maximum torque delivered to the transmission from the drive unit. When the automatic transmission is in first gear with the torque converter stalled, the control system limits the maximum torque to a first level when the vehicle drivetrain assembly is in the first mode and to a second level (Continued)

when the vehicle drivetrain assembly is in the second mode, the first level being lower than the second level.

13 Claims, 4 Drawing Sheets

(51) Int. Cl.
| | | |
|---|---|---|
| *F16H 59/58* | (2006.01) | |
| *F16H 59/64* | (2006.01) | |
| *F16H 59/66* | (2006.01) | |
| *F16H 59/72* | (2006.01) | |

(52) U.S. Cl.
CPC ............. *F16H 59/66* (2013.01); *F16H 59/72* (2013.01); *F16H 2059/525* (2013.01); *F16H 2059/663* (2013.01); *F16H 2063/508* (2013.01)

(58) Field of Classification Search
CPC ......... F16H 2059/525; F16H 2059/663; F16H 63/50; F16H 2063/508
See application file for complete search history.

(56) References Cited

U.S. PATENT DOCUMENTS

| | | |
|---|---|---|
| 2008/0033618 A1 | 2/2008 | Kwon |
| 2011/0054749 A1* | 3/2011 | Merrion .................. F16D 31/08 701/58 |
| 2015/0266479 A1* | 9/2015 | Blakeway ....... B60W 30/18027 477/92 |
| 2016/0010703 A1* | 1/2016 | Merrion .................. F16H 63/50 701/68 |
| 2016/0031431 A1 | 2/2016 | Johri et al. |
| 2018/0354493 A1 | 12/2018 | Johri et al. |
| 2020/0385000 A1 | 12/2020 | Chen et al. |

OTHER PUBLICATIONS

International Search Report and Written Opinion corresponding to application PCT/EP2022/078436, dated Feb. 2, 2023, 15 pages.

* cited by examiner

VEHICLE DRIVETRAIN MODES

TECHNICAL FIELD

The present disclosure relates to vehicle drivetrain modes and particularly, but not exclusively, to passenger vehicles having groups of modes which include a high performance and/or launch mode. Aspects of the invention relate to a vehicle drivetrain assembly, a method of operating a vehicle drivetrain assembly, a computer program, a non-transitory computer readable storage medium and a signal where these are the subjects of each the independent claims.

BACKGROUND

It is known to provide vehicles such as passenger vehicles (e.g., cars) with multiple user selectable vehicle modes for controlling the dynamics and/or performance of the vehicle.

Among such modes it is often desirable to provide a mode offering high performance characteristics and/or a launch mode offering the potential for the fastest acceleration time for the vehicle given prevailing conditions and/or a mode offering enhanced sporty performance. It is therefore desirable to develop modes having features which allow improved performance, in particular acceleration for launch, whilst at the same time preserving the reliability and longevity of the drivetrain and consistency of user experience.

SUMMARY OF THE INVENTION

Aspects and embodiments of the invention provide a vehicle drivetrain assembly, a control system for a vehicle drivetrain assembly, a method of operating a vehicle drivetrain assembly, a computer program, a non-transitory computer readable storage medium and a signal as claimed in the appended claims.

According to an aspect of the invention there is provided a vehicle drivetrain assembly operable in a first mode and a second mode, the vehicle drivetrain assembly comprising:
  a drive unit arranged to generate power to drive a vehicle;
  an automatic transmission comprising a torque converter and operatively coupled to the drive unit to receive the power; and
  a control system comprising one or more controllers, the control system being arranged to adjustably limit the maximum torque delivered to the transmission from the drive unit.

According to another aspect of the invention there is provided a vehicle drivetrain assembly operable in a first mode and a second mode, the vehicle drivetrain assembly comprising:
  a drive unit arranged to generate power to drive a vehicle;
  an automatic transmission comprising a torque converter and operatively coupled to the drive unit to receive the power; and
  a control system comprising one or more controllers, the control system being arranged to adjustably limit the maximum torque delivered to the transmission from the drive unit,
  wherein when the automatic transmission is in first gear with the torque converter stalled, the control system limits the maximum torque to a first level when the vehicle drivetrain assembly is in the first mode and to a second level when the vehicle drivetrain assembly is in the second mode, the first level being lower than the second level.

In this manner, a difference between initial transient response at launch of the vehicle may be introduced between the first and second modes. Specifically, initial transient response may be enhanced as a result of the higher torque limit in the second mode. By way of example, the higher torque limit in the second mode may allow for the potential of higher exhaust gas flow for use in turbocharging.

In some embodiments, the second level is above that intended for general use of the vehicle drivetrain assembly. Thus, the second level may offer enhanced performance for more occasional use. Additionally or alternatively, the second level may be the highest level available under the recited circumstances in any mode.

In some embodiments, when the automatic transmission is in first gear with the torque converter non-stalled, the control system limits the maximum torque to a third level when the vehicle drivetrain assembly is in the first mode and to a fourth level when the vehicle drivetrain assembly is in the second mode, the third level being lower than the fourth level. In this manner, a difference between peak vehicle acceleration in first gear may be introduced between the first and second modes. Specifically, peak vehicle acceleration may be enhanced as a result of the higher torque limit when in the second mode. Further, where both the second level and fourth levels have higher torque limits (i.e., the second mode has higher torque limits in first gear both when the torque converter is stalled and when it is non-stalled) the combined effect may further enhance performance. Specifically, higher torque when the torque converter is stalled may facilitate greater initial vehicle acceleration, which may in turn assist in reaching a higher torque and/or reaching a higher torque sooner, permitted by the fourth torque limit when the torque converter is non-stalled.

In some embodiments, the fourth level is above that intended for general use of the vehicle drivetrain assembly. Thus, the fourth level may offer enhanced vehicle performance for more occasional use. Additionally or alternatively, the fourth level may be the highest level available under the recited circumstances in any mode.

In some embodiments, the second and fourth levels are different. This may allow tailoring of the higher torque levels that are permittable in the different circumstances (e.g. in accordance with the loads placed on the drivetrain when the torque converter is and isn't stalled).

In some embodiments, the fourth level is higher than the second level. It may be that higher torque loads can be accommodated when the torque converter is non-stalled because the drive unit speed is changing and so some torque is consumed in accelerating the drive unit itself, as contrasted with circumstances where the torque converter is stalled and more of the torque is absorbed by the drive train.

In some embodiments, the first and the third levels are the same. Thus, it may be that in the first mode, where for instance ultimate vehicle performance may be less of a priority, no difference to the torque limit exists between circumstances where the torque converter is and isn't stalled.

In some embodiments the automatic transmission comprises at least one additional gear with a lower gear ratio than the first gear and for which a maximum torque limit imposed by the control system is consistent regardless of whether the vehicle drivetrain assembly is in the first or the second mode. Indeed, it may be that no torque limits are applied in higher gears because it may be that there is no need to manage the drive unit torque when operating in these gears.

In some embodiments, when the vehicle drivetrain assembly is in the second mode, the control system imposes less torque reduction during gear changes of the automatic transmission than when the vehicle drivetrain assembly is in the first mode. Imposing less torque reduction during gear shifts in this manner may improve vehicle acceleration performance. This may however come at the expense of driving refinement. Specifically, drive unit torque is generally reduced momentarily during upshifts and the torque gap is filled with torque converter inertia. This allows for a reduced shift time and greater comfort. However, where this torque reduction is reduced or omitted altogether, a summation effect of the torque delivered from the drive unit and the torque converter inertia may be achieved. This may produce a surging effect which may ultimately improve vehicle acceleration. By combining this feature with the other second mode features previously discussed, overall vehicle acceleration performance may be further improved.

In some embodiments the first and second modes of the vehicle drivetrain assembly differ in at least one of the following respects:
  i) accelerator mapping;
  ii) revolutions per minute shift point for gear changes;
  iii) peak drive unit torque;
  iv) drive unit torque limit during transmission upshift;
  v) transmission shift duration.

By way of example, it may be that in the second mode, accelerator mapping is more aggressive and/or shorter shifting from first gear into second gear occurs than in the first mode. Such differences may compliment their respective modes (e.g., in terms of performance bias).

In some embodiments, the vehicle drivetrain assembly is arranged to allow user selection between the first and the second modes. In this manner the user may select the mode with the characteristics better suiting their present need and/or desire.

In some embodiments, user selection of the second mode requires a plurality of inputs by the user. This may complement characteristics of the second mode, being suggestive of an advanced and/or more occasional use mode. It may be for example that a sequence of inputs would be: selection of one or more specific modes/positions for the vehicle systems (e.g. transmission/drivetrain/chassis/performance modes) and in that or those modes, full application of accelerator and brake pedals for a predetermined duration, while the vehicle is stationary. Using a sequence of inputs rather than a single input in order to access the second mode, greatly reduces the chance of the second mode being selected unintentionally.

In some embodiments, if the torque converter is maintained in a stalled state for a predetermined time with the vehicle drivetrain assembly in the second mode, the second mode is deactivated. In this manner if vehicle launch does not occur within the predetermined time, the second mode may be deactivated to prevent over-heating and/or to maintain consistency of experience.

In some embodiments the vehicle drivetrain assembly is arranged so that selection and/or normal functioning of the second mode is conditional upon at least one of the following:
  i) a determination of a weight of the vehicle being below a predetermined limit;
  ii) an uphill gradient on which the vehicle is situated being below a predetermined limit;
  iii) a determination that there is no towed load attached via a tow bar of the vehicle;
  iv) a determination that a steering wheel angle of the vehicle is not exceeding a predetermined limit;
  v) a determination that one or more operating temperatures of the vehicle drivetrain assembly are not above respective predetermined limits;
  vi) a determination that ambient temperature is not above a predetermined limit and/or below a predetermined limit;
  vii) a determination that one or more complimentary modes have been selected and/or are operational.

These conditions may protect the vehicle drivetrain assembly from the higher torque permitted in the second mode where the circumstances of the vehicle might mean that the resulting loads generated might be increased and may therefore be unacceptable. By way of example, where for instance the vehicle is more heavily laden and/or is located on an uphill gradient and especially where both of these conditions exist, increased load on the rear axle will occur. Operation temperatures of the vehicle drivetrain monitored may for instance include engine oil, engine coolant, gearbox oil, transmission torque converter, transmission clutches, and transmission torque converter protection function. These temperatures may for instance indicate repeated use of the second mode within a relatively short time frame, which may be unadvisable.

In some embodiments, when the conditionality is not satisfied, the second mode is cancelled or adjusted. Adjustment might for instance include alteration of the torque limits of the second and/or fourth levels to lower levels. Specifically, and by way of example, in some embodiments the adjustment comprises revising the second level to a maximum torque limit of a fifth level, where the fifth level is lower than the second level. The fifth level may be higher than or equal to the first level.

In some embodiments the second mode is a vehicle launch mode. The characteristics of the second mode as previously described may improve vehicle launch performance in terms of vehicle acceleration and so may be suited to a launch mode. Additionally or alternatively the second mode may be a performance mode and/or may be the highest performance launch mode of the vehicle.

In some embodiments the drive unit comprises an internal combustion engine. Additionally or alternatively, the drive unit may comprise one or more electric motors.

According to yet another aspect of the invention there is provided a vehicle comprising the vehicle drivetrain assembly of either of the previous aspects.

According to a further aspect of the invention there is provided a control system for a vehicle drivetrain assembly, the control system comprising one or more controllers and the control system further comprising:
  i) an input means arranged to receive,
    a selection between a first mode and a second mode;
    a signal indicative of whether an automatic transmission of the vehicle drivetrain assembly is in first gear; and
    a signal indicative of whether a torque converter of the automatic transmission is stalled;
  ii) a processing means arranged to determine a maximum torque limit for torque delivered to the transmission produced by a drive unit of the vehicle drivetrain assembly and when the automatic transmission is in first gear with the torque converter stalled, the processor determines a maximum torque at a first level when the vehicle drivetrain assembly is in the first mode and determines a maximum torque at a second level when the vehicle drivetrain assembly is in the second mode, the first level being lower than the second level;

iii) an output means arranged to send a signal to control torque delivery to the transmission in accordance with the determined torque limit.

According to a still further aspect of the invention there is provided a method of operating a vehicle drivetrain assembly where the vehicle drivetrain assembly comprises:
- a drive unit arranged to generate power to drive a vehicle; and
- an automatic transmission operatively coupled to the drive unit to receive the power, where the automatic transmission comprises a torque converter,
- the method comprising:
  - when the automatic transmission is in first gear with the torque converter stalled, limiting the maximum torque delivered to the transmission from the drive unit to a first level when the vehicle drivetrain assembly is operating in a first mode and to a second level when the vehicle drivetrain assembly is in the second mode, the first level being lower than the second level.

According to a still further aspect of the invention there is provided a computer program that, when read by a computer, causes performance of the method described above.

According to a still further aspect of the invention there is provided computer readable instructions that, when read by a computer, cause performance of the method described above.

According to a still further aspect of the invention there is provided a signal comprising computer readable instructions that, when ready be a computer, cause performance of the method described above.

Any controller or controllers described herein may suitably comprise a control unit or computational device having one or more electronic processors. Thus, the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
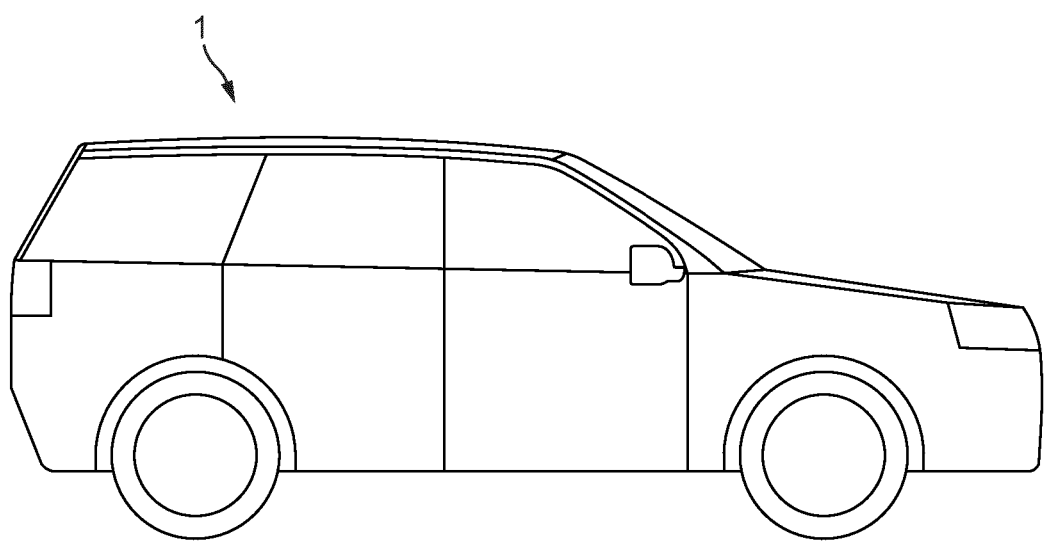
FIG. 1 shows a perspective view of a vehicle according to an embodiment of the invention.

Referring to FIG. 1 a vehicle is generally shown at 1. The vehicle 1 has a vehicle drivetrain assembly (not shown) having a torque converter and an automatic transmission. In this example, the automatic transmission comprises eight forward gears and one reverse gear. A first forward gear of the gears has the highest gear ratio, with the remaining forward gears in ascending order having progressively lower gear ratios. The vehicle drivetrain assembly also has a drive unit (in this case an internal combustion engine) arranged to generate power to drive the vehicle. The drive unit of the vehicle drivetrain assembly is arranged so that torque generated by the drive unit is transmitted to the driven vehicle wheels via the automatic transmission. As will be appreciated, in other embodiments, different vehicle drivetrain assemblies may be used (e.g. having a different number of forward gears and/or having an electric hybrid drive unit). The vehicle drivetrain assembly also has a controller arranged to monitor and control the drivetrain assembly.

The vehicle drivetrain assembly is operable in different modes having different performance characteristics. A first of the modes is a comfort mode configured for normal driving and emphasising refinement and vehicle composure. A second of the modes is a vehicle launch mode configured for maximum acceleration performance. The different configuration of the first and second modes arises from different torque limits applied when the vehicle is in first gear, different torque reduction during gear changes, different accelerator mapping and different revolutions per minute gear shift points.

The modes are selectable by a user of the vehicle (e.g., the driver). The first mode is selectable by a single action mode selection switch (though in other embodiments other such selection mechanisms are additionally or alternatively possible e.g., touch screen input, voice command etc.). The second mode is however (in this embodiment) only activatable in accordance with a combination of inputs by the user. Further, in this example, a plurality of conditions associated with the vehicle status must also be met. As regards the user sequence of inputs, the user must fully apply both accelerator and brake pedals of the vehicle 1 and must do so for a predetermined duration (e.g., one second). Other lengths of predetermined durations may be suitable. This may help to ensure that the second mode is not activated in error and also may be considered commensurate with the second mode being a more advanced driving mode. The controller, through suitable sensors sending signals thereto (either directly or indirectly) and the processing of data received thereby, is able to analyse the position of the accelerator and brake pedals to determine whether or not to activate the second mode. In addition, a number of conditions, monitored by the controller, must be met in order for the second mode to be activated.

The conditions are that:
i) the user has selected a performance mode (which in this case sets the drivetrain and chassis in respective performance configurations);
ii) the user has set the transmission into automatic mode;
iii) the vehicle 1 is stationary;
iv) the vehicle 1 is determined not to exceed a predetermined weight limit;
v) the vehicle 1 is determined not to be on and facing an uphill gradient above a predetermined limit;
vi) the vehicle 1 is determined not to be towing a load via a tow bar;
vii) it is determined that a steering wheel angle of the vehicle 1 is not exceeding a predetermined limit;
viii) it is determined that engine oil temperature, engine coolant temperature, gearbox oil temperature, torque converter temperature, transmission clutch temperature are below respective limits.

It will be appreciated that additional conditions may also be monitored as may be desired for a specific vehicle application. For example, it may be advantageous to determine, by means of measurement or estimation, the front and rear weight split of the vehicle, so as to determine the likely effect of weight transfer during vehicle launch. This may be used to determine whether or not to activate the second mode and may be used by the controller to further adjust the output of the drive unit and/or the control of the automatic transmission in dependence on axle loading.

Depending on the vehicle application, additional conditions must also be met before the controller activates the second mode. For example, the transmission may be provided with a torque converter protection function, arranged to monitor the number of times a vehicle launch has been made using the second mode. This may be used by the controller to estimate the temperature of the torque converter, and if it is determined that the temperature is at or above a predetermined threshold, the controller may apply a temporary derate function, preventing access to the second mode and providing an opportunity for the torque converter to cool.

The controller, through suitable sensors sending signals thereto (either directly or indirectly) and the processing of data received thereby, is able to determine whether or not these conditions are met and consequently whether or not to activate the second mode. With specific regard to the vehicle weight, in the present embodiment, this is estimated by the controller in accordance with data sent from an inertial measurement unit (IMU) in the vehicle. The IMU comprises a three-axis accelerometer and may be part of an anti-lock braking system, a stability control system or other subsystem of the vehicle 1. The vehicle weight may be estimated by comparing vehicle acceleration and drive unit output during a journey and by comparing the actual v expected vehicle acceleration on a level road. If no previous driving has been performed and/or a vehicle door has been opened since previous driving (indicating the potential for weight change) a default assumption may be made that the vehicle is over the weight limit until proved otherwise by data associated with driving. As will be appreciated, the weight of the vehicle considered should be taken to include weight associated with the driver, any passengers and any luggage/accessories, fuel etc. The gradient of the prevailing surface over which the vehicle is driving is also determined using data from the IMU and may be further corroborated by map data. Other methods are useful. The various temperature checks may tend to trigger prevention of entering of the second mode in the event of repeated use of the second mode within a short time frame.

In the present embodiment, all of these conditions must be met in order for activation, though in other embodiments any single or combination of the above conditions may be used. In particular, it is noted that combinations of any two or more from iv), v) and vi) are envisaged as potentially advantageous in protecting against overload on the vehicle drivetrain.

Additionally or alternatively, in other embodiments, a failure to meet one or more of the conditions may prompt the controller to adjust the characteristics of the second mode (as discussed further below) rather than prevent its activation.

Figure 2:
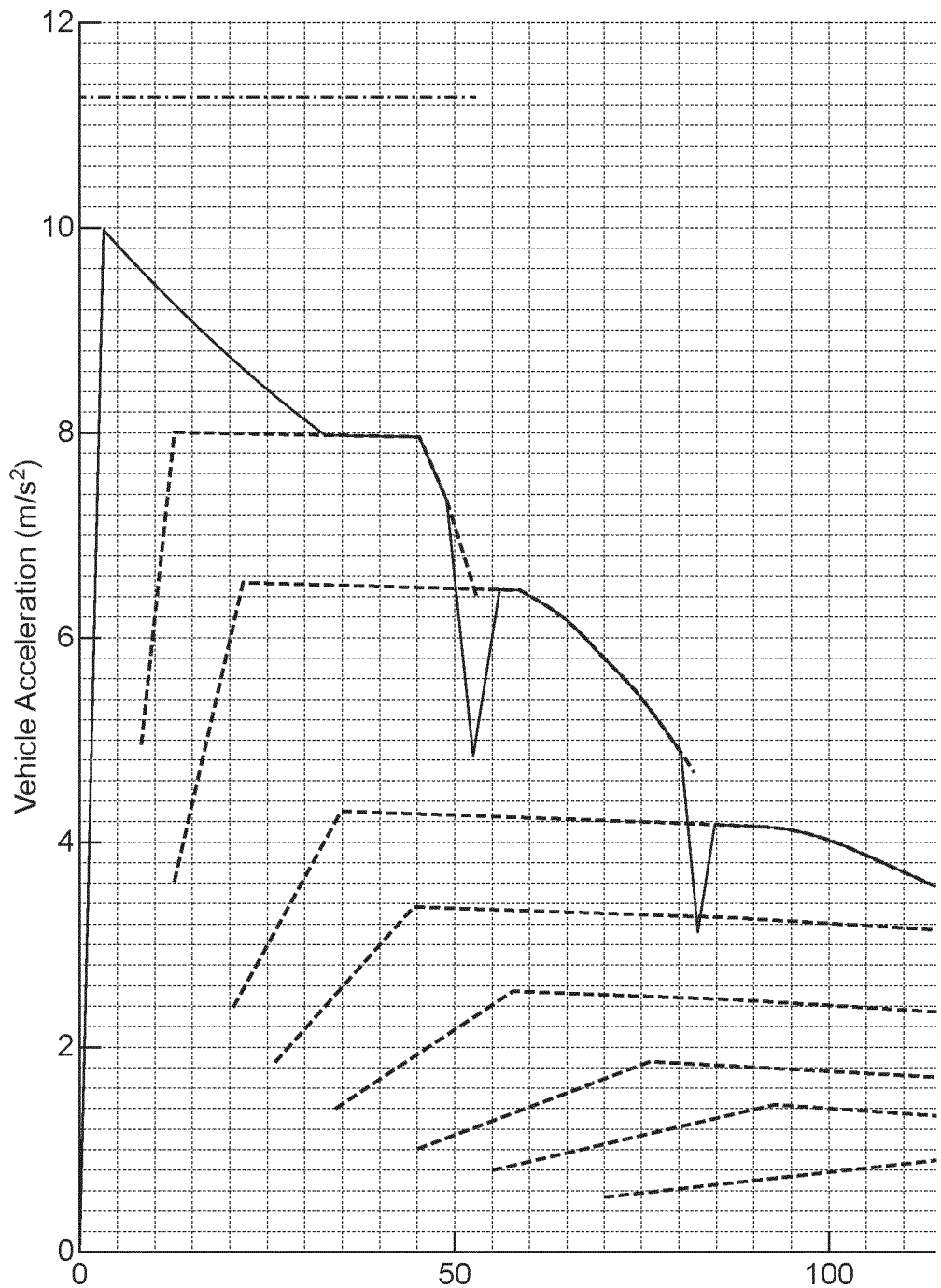
FIG. 2 shows a graph of vehicle acceleration v time in accordance with performance of a vehicle operating in a first mode in accordance with an embodiment of the invention.
Figure 3:
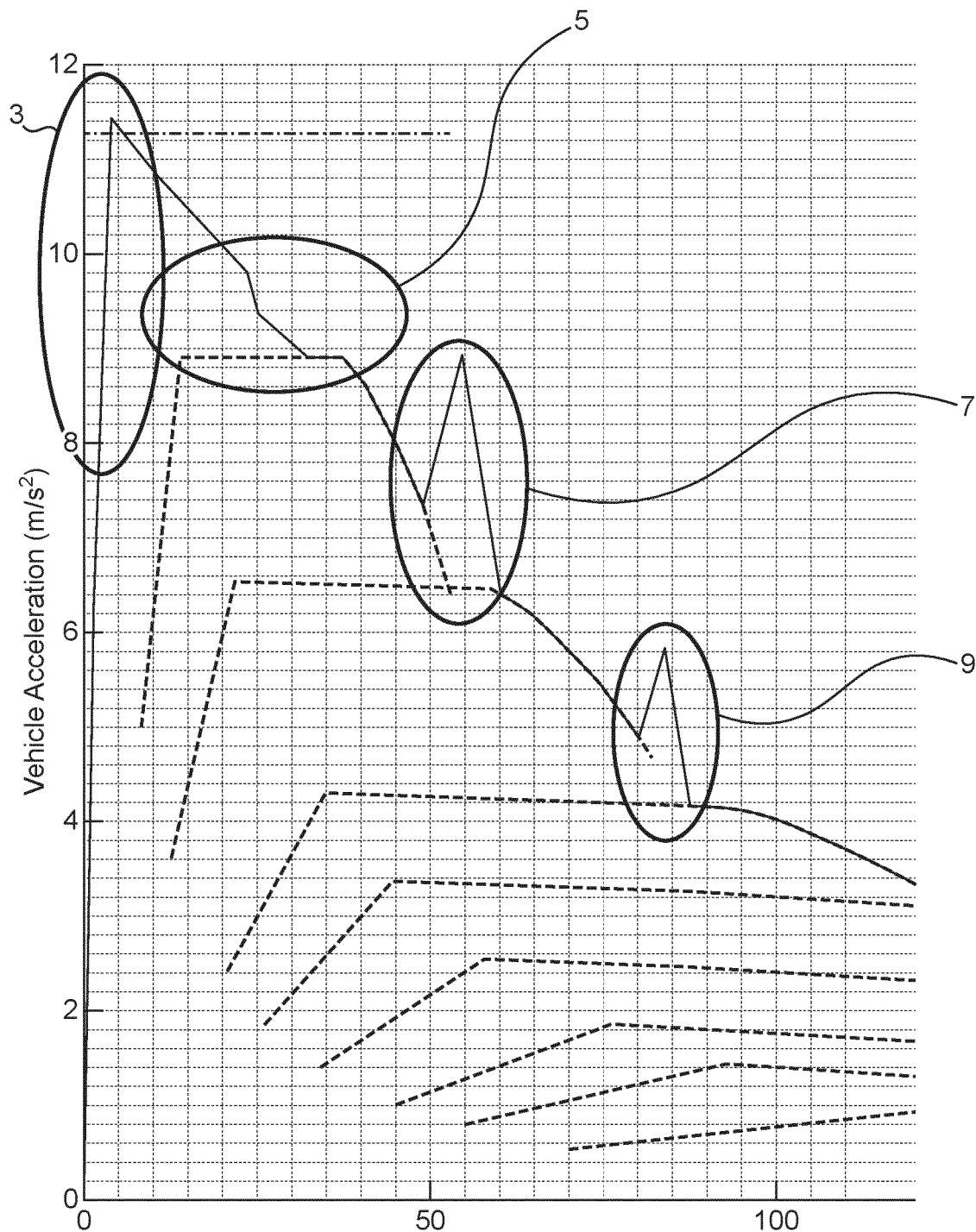
FIG. 3 shows a graph of vehicle acceleration v time in accordance with performance of a vehicle operating in a second mode in accordance with an embodiment of the invention.

Referring now to FIGS. 2 and 3, the performance characteristics of the second mode are indicated and compared with those of the first mode.

When the second mode is activated and the torque converter is stalled (i.e., when the rotational speed of the output shaft of the transmission is substantially zero, as may be the case in a condition before launch occurs) with the transmission in first gear, the controller limits the maximum torque to a second level. In the present embodiment the controller limits the torque as necessary in order that the second level is not exceeded by correspondingly limiting fuel flow where demanded fuel flow would result in torque above the second level. In other embodiments however, torque limiting may be achieved by other means.

The maximum torque limit at the second level may be contrasted with the maximum torque limit set by the controller when the vehicle drivetrain assembly is in the first mode with the transmission in first gear and the torque converter stalled, which is at a first level. This first level is lower than the second level. By limiting the torque only to the second level, additional load is placed on the vehicle drivetrain assembly by comparison with limitation to the first level in the first mode. However, additional performance is achieved when the vehicle 1 is launched because additional torque is available to begin rotating wheels of the vehicle 1 during initial transient response as the transmission is engaged and additional exhaust gas is available to charge a turbocharger of the drive unit. The various conditions for activation of the second mode help to ensure that the additional load is within design for the vehicle drivetrain assembly. Additionally, a time limit is enforced by the controller for the duration for which the second mode can be maintained with the torque converter in a stalled state. If this time is reached, the second mode is deactivated in order that the torque as dictated by the second limit is no longer possible and only lower torque levels may be reached.

As alluded to previously, in other embodiments, rather than the various conditions discussed above being met being necessary for second mode activation, even where one, some or all of the conditions are not met, it may be that the second mode can still be activated but with modified parameters. Thus for instance, the second level may be revised to a maximum torque limit of a fifth level, where the fifth level is lower than the second level.

In addition to variation between the maximum torque limits set by the controller when the torque converter is stalled in the first and second modes, there is also variation in the maximum torque limits set by the controller when the torque converter is non-stalled and still in first gear (e.g., during vehicle acceleration in first gear). Specifically, when the second mode is activated and the torque converter is non-stalled with the transmission in first gear, the controller limits the maximum torque to a fourth level. In the present embodiment the controller limits the torque as necessary in order that the fourth level is not exceeded by limiting fuel flow where demanded fuel flow would result in torque above the fourth level. In other embodiments however, torque limiting may be achieved by other means.

The maximum torque limit at the fourth level may be contrasted with the maximum torque limit set by the controller when the vehicle drivetrain assembly is in the first mode with the transmission in first gear and the torque converter non-stalled, which is at a third level. This third level is lower than the fourth level. By limiting the torque only to the fourth level, additional load is placed on the vehicle drivetrain assembly by comparison with limitation to the third level in the first mode. However, additional performance is achieved when the vehicle 1 is accelerating because additional torque is available to accelerate the wheels of the vehicle 1, increasing the peak acceleration reached in first gear. The various conditions for activation of the second mode help to ensure that the additional load is within design for the vehicle drivetrain assembly.

The maximum torque limit of the fourth level is higher than the maximum torque limit of the second level. This is because higher torque loads can be accommodated when the torque converter is non-stalled because the drive unit speed is changing and so some torque is consumed in accelerating the drive unit itself. In this embodiment however, the first and the third levels are the same, because with reduced emphasise on performance in the first mode, and all torque limits therefore being further within the capabilities of the vehicle drivetrain assembly, there is no need to distinguish between the torque converter being in stalled and non-stalled states in terms of torque limits. In addition, in higher gears (e.g., gears 2-8) no torque limits are imposed, in either the first or the second mode, because torques achievable are within the capabilities of the vehicle drivetrain assembly.

Various additional differences between the first and second modes are explained below. First, when the vehicle drivetrain assembly is in the second mode, the control system imposes less torque reduction during gear changes, such as upshifts of the automatic transmission than when the vehicle drivetrain assembly is in the first mode. This reduces the refinement of the shifts in the second mode, but increases the overall vehicle acceleration. Specifically, in the first mode, torque is reduced during gear changes and the resulting reduction in acceleration that would result during the gearchange is partially compensated with torque converter inertia. In the second mode however, torque is not reduced during shifts, and so both the unreduced torque and torque converter inertia contribute to acceleration, giving a surge effect and increased vehicle acceleration. Further differences include more aggressive accelerator mapping (i.e., quicker response to accelerator inputs) in the second mode than the first and different drive unit operating speed (revolutions per minute) gear shift points in the two different modes. For instance, in the second mode, short-shifting (i.e. a lower revolutions per minute gear change) is performed from first to second gear, to enable operation in second gear as quickly as possible, where no drive unit torque limits are imposed.

The relative effects on vehicle acceleration of the first and second modes when maximum vehicle acceleration is demanded by the driver is demonstrated by the graphs of vehicle acceleration v time shown in FIGS. 2 and 3, where FIG. 2 is for the first mode and FIG. 3 is for the second mode.

As can be seen, in area 3 of FIG. 3, a higher peak vehicle acceleration in first gear is reached in the second mode than in the first mode. This is due to the combined effects of the second and fourth torque limits by comparison with the first and third torque limits of the first mode. In area 5 of FIG. 3, it can be seen that higher vehicle acceleration is maintained throughout first gear and during the upshift to second gear as a consequence of the combined effects of the second and fourth torque limits by comparison with the first and third torque limits of the first mode and in view of the reduced torque reduction of the second mode during the gear shift. Additionally, the shift to second gear occurs earlier, due to a higher revolutions per minute being reached sooner and the short-shifting to second gear. In areas 7 and 9 as shifts occur from second to third gear and from third to fourth gear respectively, a surge in acceleration can be seen in the second mode, whereas a reduction in vehicle acceleration is seen in the first mode. This arises in view of the greater reduction in torque during shifts in the first mode than in the second mode.

The effect overall of the second mode is a faster acceleration time and a potentially more dynamic and/or engaging driving experience with somewhat reduced refinement by comparison with the first mode.

Figure 4:
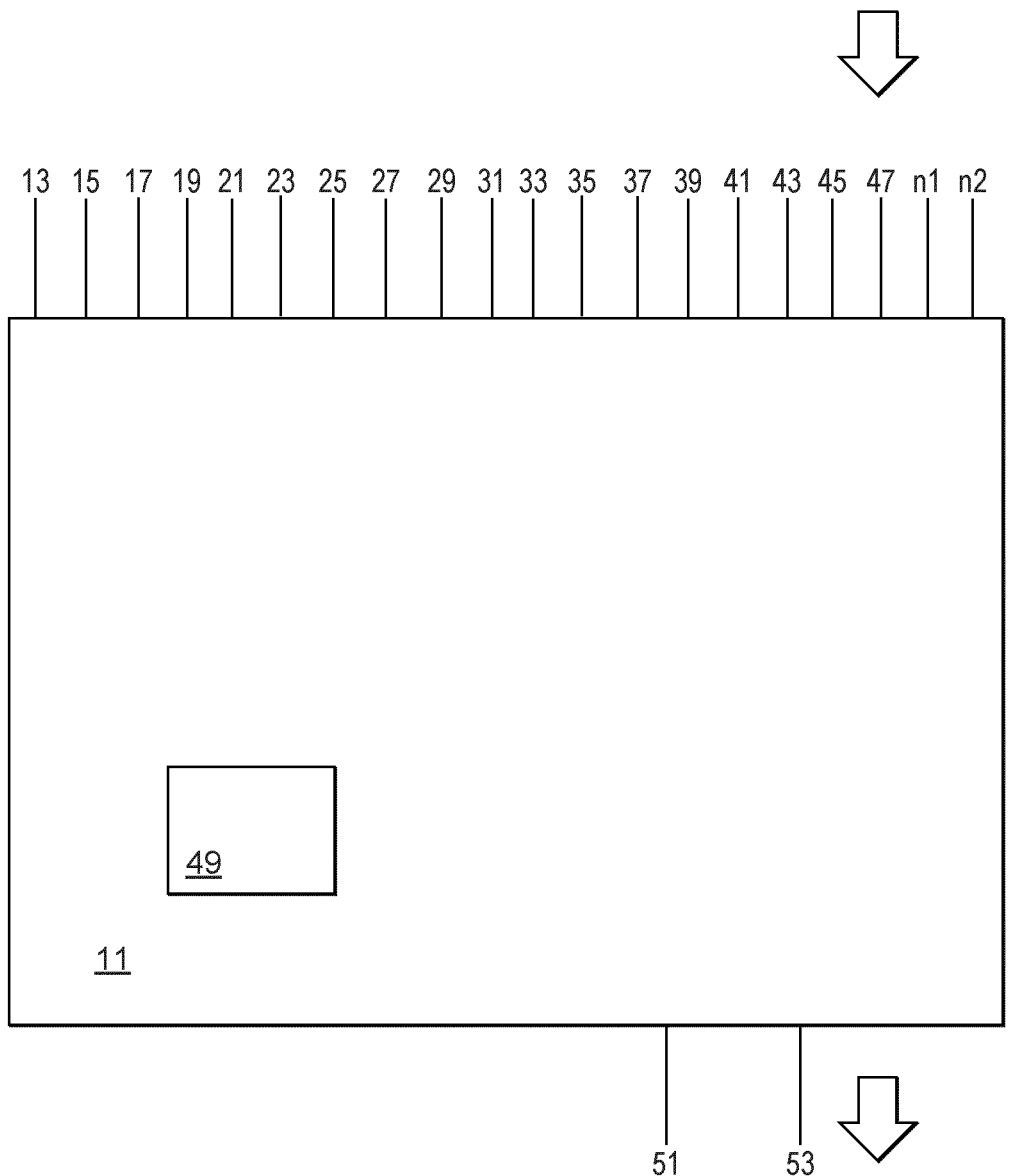
FIG. 4 shows a schematic view of a controller according to an embodiment of the invention.

With reference to FIG. 4, a schematic view of the controller 11 is shown. The controller has:

a mode selector input 13 which receives a signal or signals indicative of the mode selected by a user of the vehicle;

a gear input 15 which receives a signal or signals indicative of whether the automatic transmission of the vehicle drivetrain assembly is in first gear;

a torque converter input 17 which receives a signal or signals indicative of whether or not the torque converter is stalled;

a accelerator pedal input 19 which receives a signal or signals indicative of the actuation extent of the accelerator pedal (e.g., by means of an accelerator pedal position sensor signal);

a brake pedal input 21 which receives a signal or signals indicative of the actuation extent of the brake pedal (e.g., by means of a brake pressure sensor signal);

a door input 23 which receives a signal or signals indicative of whether or not one or more doors (including a tailgate or trunk lid) of the vehicle are open;

a performance mode input 25 which receives a signal or signals indicative of a performance mode selected by a user of the vehicle;

a transmission input 27 which receives a signal or signals indicative of whether the transmission is set in an automatic mode;

a vehicle speed input 29 which receives a signal or signals indicative of whether or not the vehicle 1 is stationary;

a weight input 31 which receives a signal or signals indicative of the weight of the vehicle 1;

a gradient input 33 which receives a signal or signals indicative of the gradient of the surface on which the vehicle is standing or travelling;

a towing input 35 which receives a signal or signals indicative of whether or not the vehicle is towing a load via a towbar;

a steering input 37 which receives a signal or signals indicative of the amount of steering lock applied to a steering wheel of the vehicle 1;

an engine oil input 39 which receives a signal or signals indicative of engine oil temperature for the drive unit;

an engine coolant input 41 which receives a signal or signals indicative of engine coolant temperature for the drive unit;

a gearbox oil input 43 which receives a signal or signals indicative of gearbox oil temperature;

a torque converter temperature input 45 which receives a signal or signals indicative of torque converter temperature; and a transmission clutch input 47 which receives a signal or signals indicative of transmission clutch temperature.

The controller 11 also has a processor 49 which determines which of the first and second modes to activate and whether to deactivate the second mode when activated as well as managing torque limits and shift times. These decisions are made in accordance with which of the first and second modes is activated and in dependence on the signals received from the inputs 13, 15, 17, 19, 21, 23, 25, 27, 29, 31, 33, 35, 37, 39, 41, 43, 45, 47 and in accordance with the principles previously described in this specific description.

The controller 11 also has a drive unit output 51 and a transmission output 53 via which the processor 49 sends signals to enforce torque limits and shift times in accordance with the determinations of the processor 49.

It will be appreciated that the controller 11 may be configured with additional inputs, represented by n1 and n2 in FIG. 4. These inputs may be arranged to receive additional signals from other vehicle sub-systems as may be desired and which may also be used by the controller 11 to determine which operating mode to operate in. For example, for a vehicle with a driveline comprising a multi-speed transfer case, the controller 11 may receive a status signal n1 from that transfer case, indicative of whether it is operating in HIGH or LOW range. HIGH range is intended for on road driving, whilst LOW range is intended for use when driving off-road. Access to the second operating mode may be limited to use only when the transfer case is operating in HIGH so as to protect the driveline components from excess loading during vehicle launch. Additionally or alternatively, the controller 11 may receive a signal n2 from a vehicle security system arranged to determine the identity of the driver. The identity may be determined based on whether the vehicle is operating in a full access mode or a valet mode. In full access mode, the full performance of the vehicle is available to the driver. In valet mode, the vehicle performance is limited as the driver operating the vehicle in this mode is not likely to be the vehicle owner or otherwise authorised user. In this way, access to the second mode can be limited by the vehicle owner or other authorised user as may be desired.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine-readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A vehicle drivetrain assembly operable in a first mode and a second mode, the vehicle drivetrain assembly comprising:

a drive unit arranged to generate power to drive a vehicle;

an automatic transmission comprising a torque converter and operatively coupled to the drive unit to receive the power; and a control system comprising one or more controllers, the control system being arranged to adjustably limit a maximum torque delivered to the transmission from the drive unit, wherein when the automatic transmission is in first gear with the torque converter stalled, the control system limits the maximum torque to a first level when the vehicle drivetrain assembly is in the first mode and to a second level when the vehicle drivetrain assembly is in the second mode, the first level being lower than the second level.

2. A vehicle drivetrain assembly according to claim 1 wherein when the automatic transmission is in first gear with the torque converter non-stalled, the control system limits the maximum torque to a third level when the vehicle drivetrain assembly is in the first mode and to a fourth level when the vehicle drivetrain assembly is in the second mode, the third level being lower than the fourth level.

3. A vehicle drivetrain assembly according to claim 2 wherein the fourth level is higher than the second level.

4. A vehicle drivetrain assembly according to claim 2 wherein the first and the third levels are the same.

5. A vehicle drivetrain assembly according to claim 1 wherein when the vehicle drivetrain assembly is in the second mode, the control system imposes less torque reduction during gear changes of the automatic transmission than when the vehicle drivetrain assembly is in the first mode.

6. A vehicle drivetrain assembly according to claim 1 arranged so that when the vehicle drivetrain assembly is in the second mode, no torque reduction occurs during gear changes of the automatic transmission.

7. A vehicle drivetrain assembly according to claim 1 wherein the first and second modes of the vehicle drivetrain assembly differ in at least one of the following respects:
   i) accelerator mapping;
   ii) revolutions per minute shift point for gear changes;
   iii) peak drive unit torque;
   iv) drive unit torque limit during transmission upshift; and
   v) transmission shift duration.

8. A vehicle drivetrain assembly according to claim 1 arranged so that if the torque converter is maintained in a stalled state for a predetermined time with the vehicle drivetrain assembly in the second mode, the second mode is deactivated.

9. A vehicle drivetrain assembly according to claim 1 arranged so that selection and/or normal functioning of the second mode is conditional upon at least one of the following:
   i) a determination of a weight of the vehicle being below a predetermined limit;
   ii) an uphill gradient on which the vehicle is situated being below a predetermined limit;
   iii) a determination that there is no towed load attached via a tow bar of the vehicle;
   iv) a determination that a steering wheel angle of the vehicle is not exceeding a predetermined limit;
   v) a determination that one or more operating temperatures of the vehicle drivetrain assembly are not above respective predetermined limits;
   vi) a determination that ambient temperature is not above a predetermined limit and/or below a predetermined limit; and
   vii) a determination that one or more complimentary modes have been selected and/or are operational.

10. A vehicle comprising the vehicle drivetrain assembly of claim 1.

11. A control system for a vehicle drivetrain assembly, the control system comprising one or more controllers and the control system further comprising:
   i) an input means arranged to receive,
      a selection between a first mode and a second mode;
      a signal indicative of whether an automatic transmission of the vehicle drivetrain assembly is in first gear; and
      a signal indicative of whether a torque converter of the automatic transmission is stalled;
   ii) a processor arranged to determine a maximum torque limit for torque delivered to the transmission produced by a drive unit of the vehicle drivetrain assembly and when the automatic transmission is in the first gear with the torque converter stalled, the processor determines a maximum torque at a first level when the vehicle drivetrain assembly is in the first mode and determines a maximum torque at a second level when the vehicle drivetrain assembly is in the second mode, the first level being lower than the second level;
   iii) an output means arranged to send a signal to control torque delivery to the transmission in accordance with the determined torque limit.

12. A method of operating a vehicle drivetrain assembly where the vehicle drivetrain assembly comprises:
   a drive unit arranged to generate power to drive a vehicle; and
   an automatic transmission operatively coupled to the drive unit to receive the power, where the automatic transmission comprises a torque converter,
   the method comprising:
   when the automatic transmission is in first gear with the torque converter stalled, limiting a maximum torque delivered to the transmission from the drive unit to a first level when the vehicle drivetrain assembly is operating in a first mode and to a second level when the vehicle drivetrain assembly is in a second mode, the first level being lower than the second level.

13. A non-transitory computer readable storage medium comprising computer readable instructions that, when read by a computer, cause performance of the method as claimed in claim 12.

* * * * *